US008738562B2

(12) United States Patent
Oaten et al.

(10) Patent No.: US 8,738,562 B2
(45) Date of Patent: *May 27, 2014

(54) UNIVERSAL DATA DISCERNMENT

(71) Applicant: Global Healthcare Exchange, LLC, Louisville, CO (US)

(72) Inventors: Philip J. Oaten, Old Tappan, NJ (US); Lou A. Davis, Arlington Heights, IL (US)

(73) Assignee: Global Healthcare Exchange, LLC, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/038,457

(22) Filed: Sep. 26, 2013

(65) Prior Publication Data

US 2014/0025622 A1  Jan. 23, 2014

Related U.S. Application Data

(63) Continuation of application No. 13/368,668, filed on Feb. 8, 2012, now Pat. No. 8,572,012, which is a continuation of application No. 12/244,679, filed on Oct. 2, 2008, now Pat. No. 8,135,655.

(51) Int. Cl.
*G06F 17/00* (2006.01)
*G06N 5/02* (2006.01)
(52) U.S. Cl.
USPC ............................................................ 706/51
(58) Field of Classification Search
None
See application file for complete search history.

(56) References Cited

U.S. PATENT DOCUMENTS

| 8,135,655 | B2* | 3/2012 | Oaten et al. | 706/13 |
| 8,572,012 | B2* | 10/2013 | Oaten et al. | 706/13 |
| 2001/0040590 | A1 | 11/2001 | Abbott et al. | |
| 2006/0206502 | A1 | 9/2006 | Gaurav et al. | |
| 2008/0162498 | A1 | 7/2008 | Omoigui | |

OTHER PUBLICATIONS

International Search Report and Written Opinion for International Application No. PCT/US2009/056442 dated Oct. 26, 2009.
International Preliminary Report on Patentability for International Application No. PCT/US2009/056442 dated Sep. 29, 2011.
Non-Final Rejection dated Aug. 11, 2011, U.S. Appl. No. 12/244,679.
Notice of Allowance dated Nov. 15, 2011, U.S. Appl. No. 12/244,679.
Non Final Office Action dated Dec. 12, 2012, U.S. Appl. No. 13/368,668.
Non Final Office Action dated Feb. 7, 2013, U.S. Appl. No. 13/368,668.
Notice of Allowance dated Jun. 25, 2013, U.S. Appl. No. 13/368,668.
Canadian Office Action dated May 9, 2013, Canadian Patent Application No. 2,743,311.

* cited by examiner

*Primary Examiner* — Michael B Holmes
(74) *Attorney, Agent, or Firm* — Snell & Wilmer LLP

(57) ABSTRACT

An contextual artificial intelligence system is disclosed. Intelligent business objects enable dynamic data object interaction and encapsulation of user context. Data is rationalized and data objects evolve by way of an artificial intelligence assisted process of self-discovery. Significant data is identified based upon factors such as cost, revenue and outcome and contextually significant result sets are automatically generated for users.

20 Claims, 6 Drawing Sheets

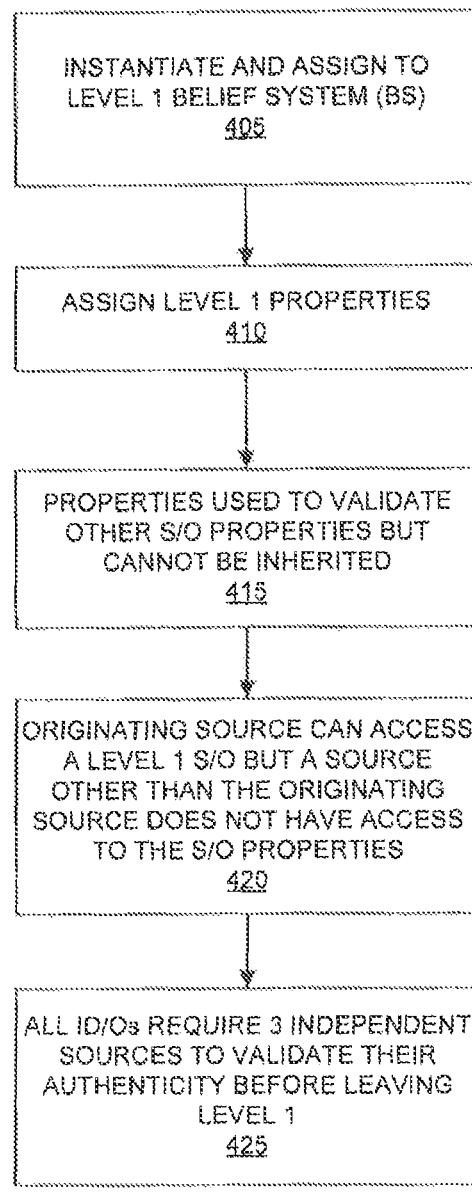

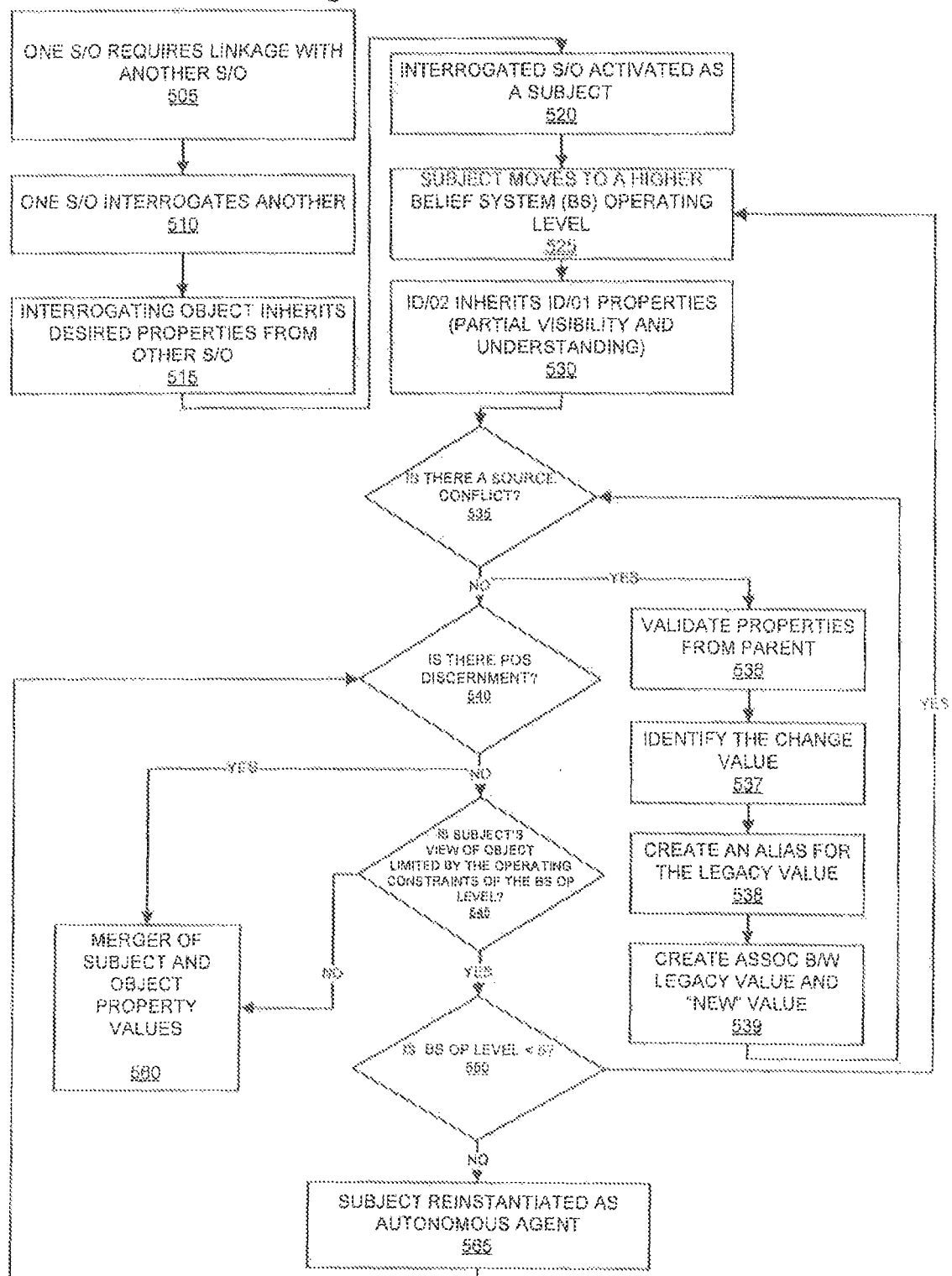
Figure 5 – ID/O Interaction

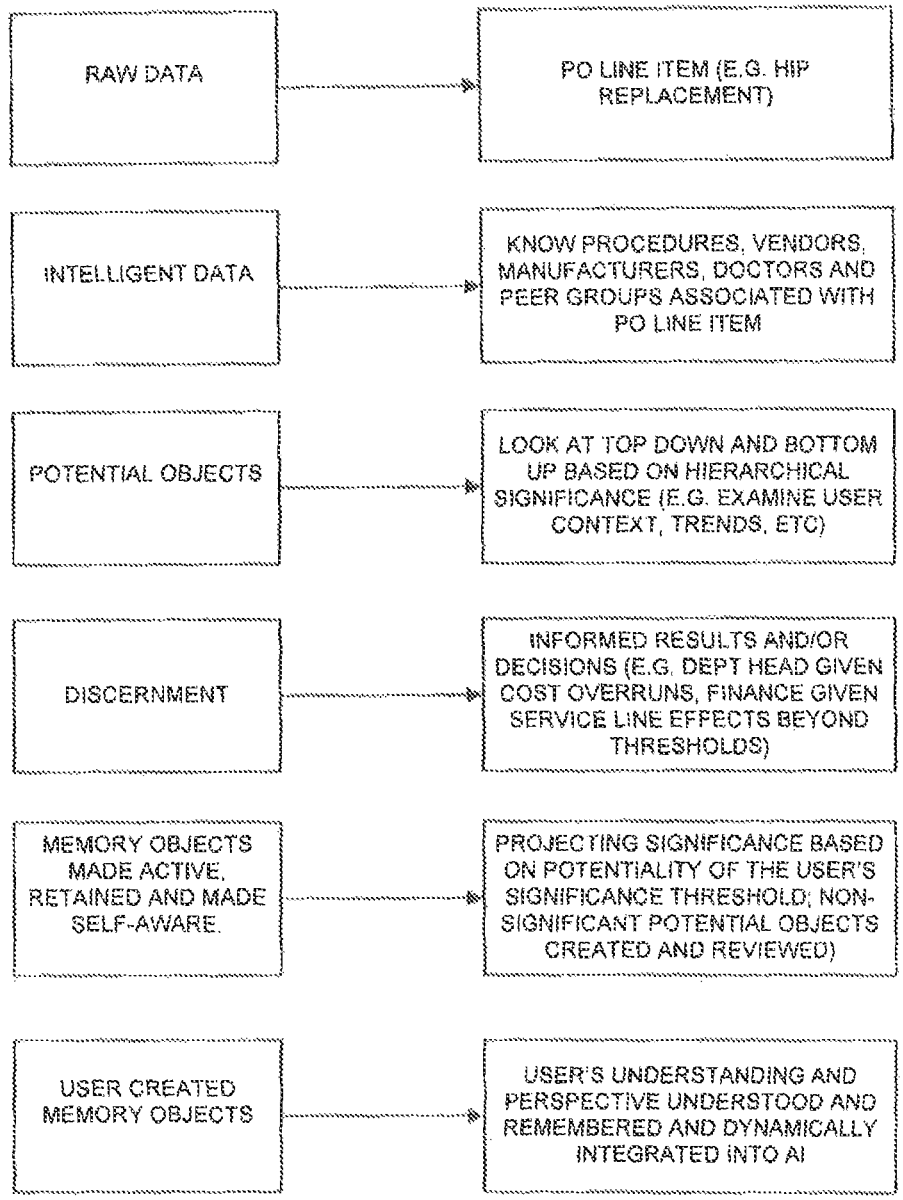
Figure 6 – Data Awareness Ladder

UNIVERSAL DATA DISCERNMENT

RELATED APPLICATION

This application is a continuation of U.S. patent application Ser. No. 13/368,668 filed on Feb. 8, 2012 and entitled UNIVERSAL DATA DISCERNMENT which is a continuation of U.S. patent application Ser. No. 12/244,679 filed on Oct. 2, 2008 and issued as U.S. Pat. No. 8,135,655 on Mar. 13, 2012, entitled "DYNAMIC INTELLIGENT OBJECTS" each of which is hereby incorporated by reference in its entirety.

FIELD OF INVENTION

The present invention generally relates to applying artificial intelligence to an analysis of business data, and more particularly, to systems and methods for enabling users to view enterprise resource data and relationships from the user's unique contextual perspective.

BACKGROUND OF THE INVENTION

The dynamic nature of information often makes it difficult and costly to maintain, and typically due to constant change, the data intrinsically lacks complete accuracy. Most systems require absolute data, which is often difficult to obtain and misleading because it lacks absolute accuracy. In addition, the various systems of an organization typically contain "application firewalls" between the systems. Each of these disparate systems is geared toward different user constituencies or business functions, and although much of the data originates from the same source, the disparate systems effectively contribute to data corruption. Furthermore, systems are usually architected to limit the data from self-learning. Fixed relationships pre-define context, and such relationships do not respond well to divergent user needs. Such data compartmentalization often undermines organizational performance by, for example, limiting insight into the impacts of decision-making across planes of significance (e.g., cost, revenue, customer outcome) and contributing little to the understanding of how the downstream impact of such decisions greatly affects the bottom line.

Therefore, a need exists for a system and method for processing information based upon probabilistic significance that varies with a variety of factors such as time, user, industry, external events and the value of the data itself. In order to promote sophisticated understanding of information and its impact on a given organization, a need exists for a system that combines the use of sophisticated object data models, probabilistic modeling, statistical analysis and artificial intelligence techniques to create intelligent, self-learning data objects, and to derive relevant and insightful results for a multitude of end-user constituencies.

SUMMARY OF THE INVENTION

The system includes an Understanding Generator ("UG") software application which comprises, in one embodiment a data rationalizer, an intelligent business object creator, a context profiler, a memory creator, a context overlay generator, a relationship generator, a what-if analyzer, a trend analyzer, a corrective action analyzer, a results formatter and an object database. The UG creates business objects that are self-aware and self-learning, and that enable the system to generate relevant results, without the need to be prompted by a user request. UG yields useful result sets by contextualizing answers via relevant significance, which are then, in one embodiment, prioritized by the user against other result sets obtained across all dimensions and all interested parties.

UG may model user perception as an energy field that is experienced over time. UG sequences and groups these perceptions into knowledge, and such knowledge is discerned by context. Experience of the context can yield significance and such significance is expressed as a probability. Business objects are therefore selected for a result set because of the probability of the business objects' significance to the business problem as perceived by the user. Such selection contributes to the creation of understanding expressed as the perception of significant context. Hence, in UG, understanding is the practical application of knowledge.

More particularly, the invention uses artificial intelligence to understand user context and the contextual significance of data in order to generate accurate, tailored and predictive result sets, in one embodiment, the invention includes: i) an artificial intelligence context profiler that is configured to create a proxy of the user in the system and interpret job function, personality profile and preference to create a user context and encapsulate it in a user context intelligent context object; ii) an artificial intelligence data rationalizer configured to processes and interrelates input data into self-learning data objects including intelligent physical object that are configured to store static attributes of a data element, intelligent energy objects that are configured to store the dynamic attributes of the data element and intelligent context objects that are configured to store data element context; and iii) a probability of fitness function that uses artificial intelligence, probabilistic and forecasting techniques to discern the significance of data within a given context.

BRIEF DESCRIPTION OF THE DRAWINGS

A more complete understanding of the present system and method may be derived by referring to the detailed description and claims when considered in connection with the Figures, wherein like reference numbers refer to similar elements throughout the Figures, and:

FIG. 4 is a representative process flow diagram for instantiating an object, in accordance with one embodiment of the present invention.

FIG. 5 is a representative process flow showing object interaction within the system to dynamically create hierarchies and relationships, in accordance with one embodiment of the present invention.

FIG. 6 is a data awareness ladder illustrating how data evolves, in accordance with one embodiment of the present invention.

DETAILED DESCRIPTION

Figure 1:
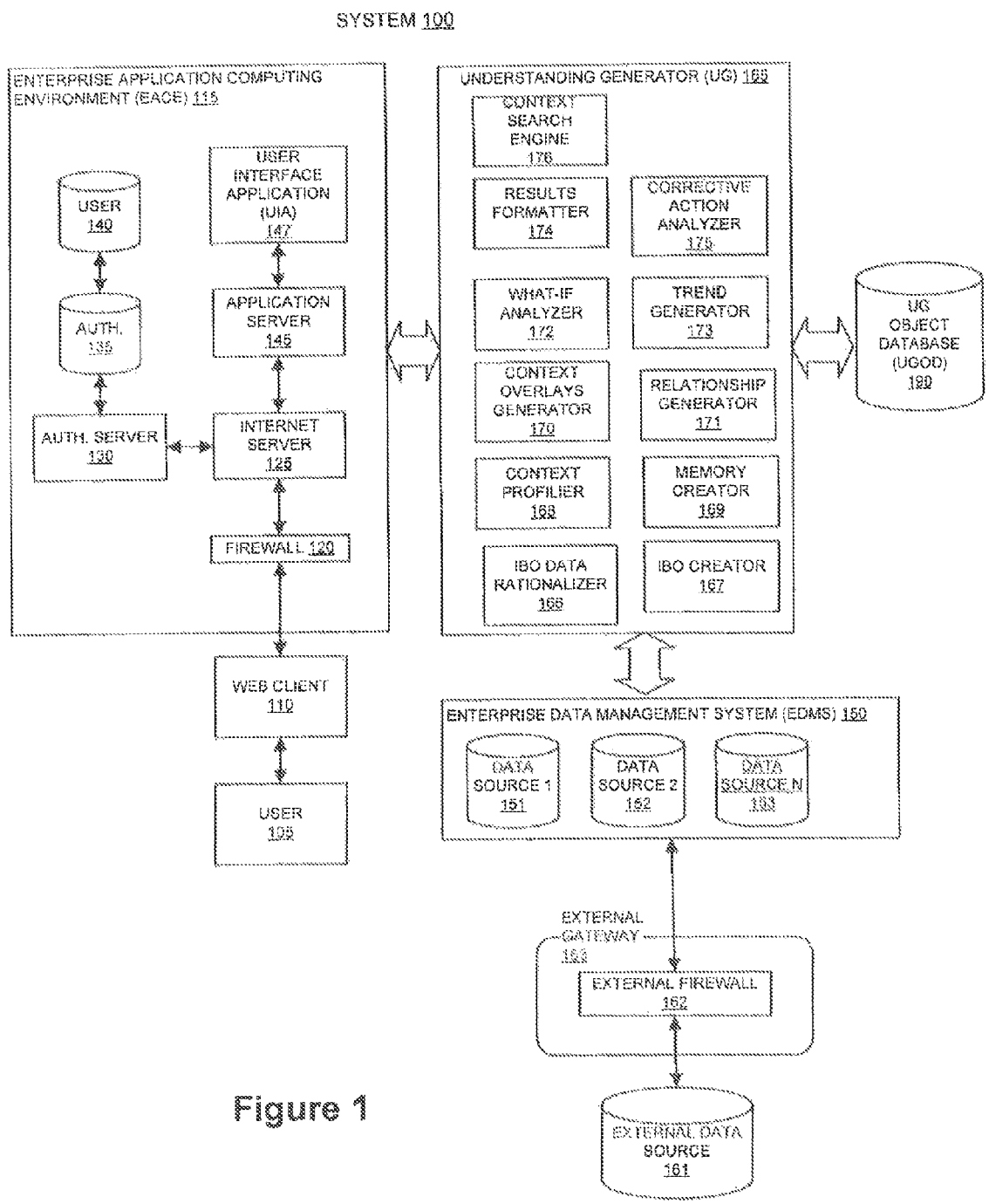
FIG. 1 is an overview of a representative system for providing a data analysis and relationships in the user's unique context, in accordance with one embodiment of the present invention.
Figure 2:
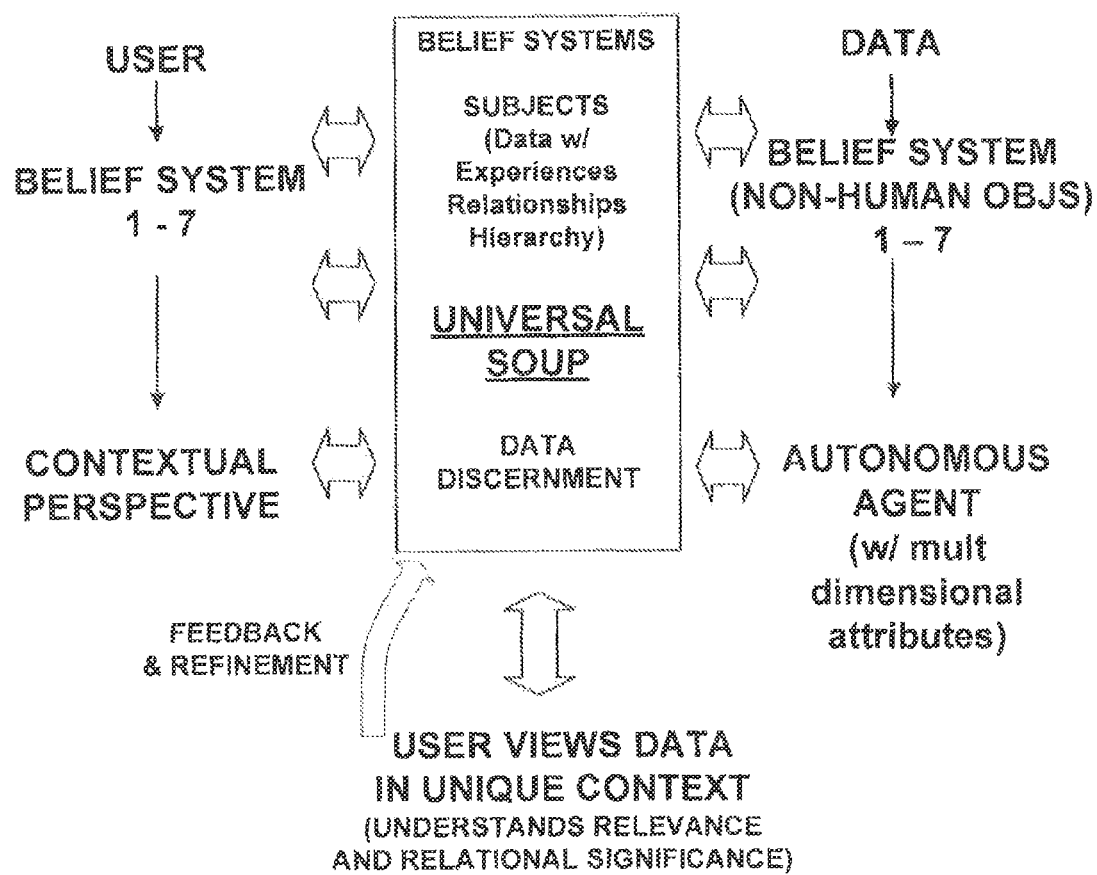
FIG. 2 is a conceptual overview of the major functions of the system, in accordance with one embodiment of the present invention.

The detailed description of exemplary embodiments of the invention herein makes reference to the accompanying figures, which show the exemplary embodiment for purposes of illustration and its best mode, and not of limitation. While these representative embodiments are described in sufficient detail to enable those skilled in the art, to practice the invention, it should be understood that other embodiments may be realized and that logical, software, hardware and mechanical changes may be made without departing from the spirit and scope of the invention. For example, the steps recited in any of the method or process descriptions may be executed in any order and are not limited to the order presented. References to singular include plural, and references to plural include singular.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements, it should be noted that many alternative or additional functional relationships or physical connections may be present in a practical system.

In one embodiment, the system and method is implemented in the healthcare industry to enhance organizational performance in managing its supply chain. While described herein in reference to enhancing supply chain information management in the healthcare industry, practitioners will appreciate that the invention may further be implemented to provide intelligent, contextually significant data management in any industry (e.g. consumer electronics, automotive, transportation, etc.).

While the description makes reference to specific technologies, system architectures and data management techniques, practitioners will appreciate that the embodiments disclosed herein are examples and that other devices and/or methods may be implemented without departing from the scope of the invention. Similarly, while the description makes frequent reference to a web client, practitioners will appreciate that other examples of user interfaces that submit messaging requests may be accomplished by using a variety of user interfaces including handheld devices such as personal digital assistants and cellular telephones. Practitioners will also appreciate that a web client is but one embodiment and that other communication, data transmission and networking devices and/or methods may be implemented without departing from the scope of the invention.

While the system may contemplate upgrades or reconfigurations of existing processing systems, changes to existing databases and business information system tools are not necessarily required by the present invention. For example, the present system may contemplate, but does not require the use of a commercially available off-the-shelf object oriented database management system. Moreover, the system may be seamlessly integrated into existing information technology, data management architectures, enterprise resource planning and/or business information system tools with minimal or no changes to existing systems.

Exemplary benefits provided by this invention include cost savings from reduced errors, lower costs from better contract alignment, and improved revenues through more accurate, continuously conditioned data. Creating the necessary linkage among most or all of the data elements (i.e. content) in an organization's supply chain allows the organization to control spending, increase contract compliance and improve receivables performance. The system provides access to continuously current and accurate information, provides individual users with customized information relevant to their unique context, and maintains multiple contextual understandings and output descriptions for any product to assist in delivering useful data to the right people in the organization.

In one embodiment, the invention is implemented to enhance the data and organizational understanding of the data in the healthcare industry. The system enables multiple hospitals, their suppliers, vendors and other constituents to, for example, (i) upload data such as the vendor master scheme, item master schema and purchase order history files in one simple step; (ii) produce content assessment reports and create a content management strategy for the organization. The assessment reports enable the organization to: determine how often items are used and determine items for removal (data relevance analysis); identify product description improvement opportunities and reconcile potentially duplicate items (data consistency analysis); and, display all or any portion of the data uploaded from a Materials Management Information System (MMIS) to determine if any data is missing (data completeness analysis); (iii) analyze supply chain costs to support and drive content management priorities; and/or (iv) optimize content management functions.

With reference to FIG. 1, the representative system includes a user 105 interfacing with an enterprise application computing environment ("EACE") 115 by way of web client 110. A user is any individual, entity, business, organization, third-party entity, software and/or hardware that interfaces with EACE 115 to access applications or data. User 105 may interface with Internet server 125 via any communication protocol, device or method discussed herein, known in the art, or later developed. In one embodiment, user 105 may interact with the EACE 115 via an Internet browser at web client 110.

Transmissions between user 105 and the Internet server 125 may pass through a firewall 120 to help ensure the integrity of the EACE 115 components. Practitioners will appreciate that the invention may incorporate any number of security schemes or none at all. In one embodiment, the Internet server 125 receives page requests from the web client 110 and interacts with various other system 100 components to perform tasks related to requests from the web client 110. Internet server 125 may invoke an authentication server 130 to verify the identity of user 105 and assign specific access rights to user 105. Authentication database 135 may store information used in the authentication process such as, for example, user identifiers, passwords, access privileges, user preferences, user statistics, and the like. When a request to access EACE 115 is received from Internet server 125, EACE 115 determines if authentication is required and transmits a prompt to the web client 110. User 105 enters authentication data at the web client 110, which transmits the authentication data to Internet server 125. Internet server 125 passes the authentication data to authentication server which queries the user database 140 for corresponding credentials. When user 105 is authenticated, user 105 may access various applications and their corresponding data sources.

When user 105 logs on to an application, Internet server 125 may invoke an application server 145. Application server 145 invokes logic in user interface application ("UIA") 147 by passing parameters relating to the user's 105 requests for data. UIA 147 may include any hardware and/or software suitably configured to receive requests from the web client 110 (e.g., via Internet server 125 and the application server 145), WA 147 may communicate with (e.g. submit requests and receive responses) understanding generator (UG) 165, Understanding Generator Object Database ("UGOD") 190 or any other system 100 component. UIA 147 is further configured to process requests, construct database queries, and/or execute queries against databases, external data sources and temporary databases, as well as exchange data with other application modules (not pictured). In one embodiment, UIA 147 may be configured to interact with other system 100 components to perform complex calculations, retrieve additional data, format data into reports, create XML representations of data, construct markup language documents, and/or the like. Moreover, the IAA 147 may partially or fully reside as a standalone system or may be incorporated with the application server 145 or any other EACE 115 component as program code.

Figure 3:
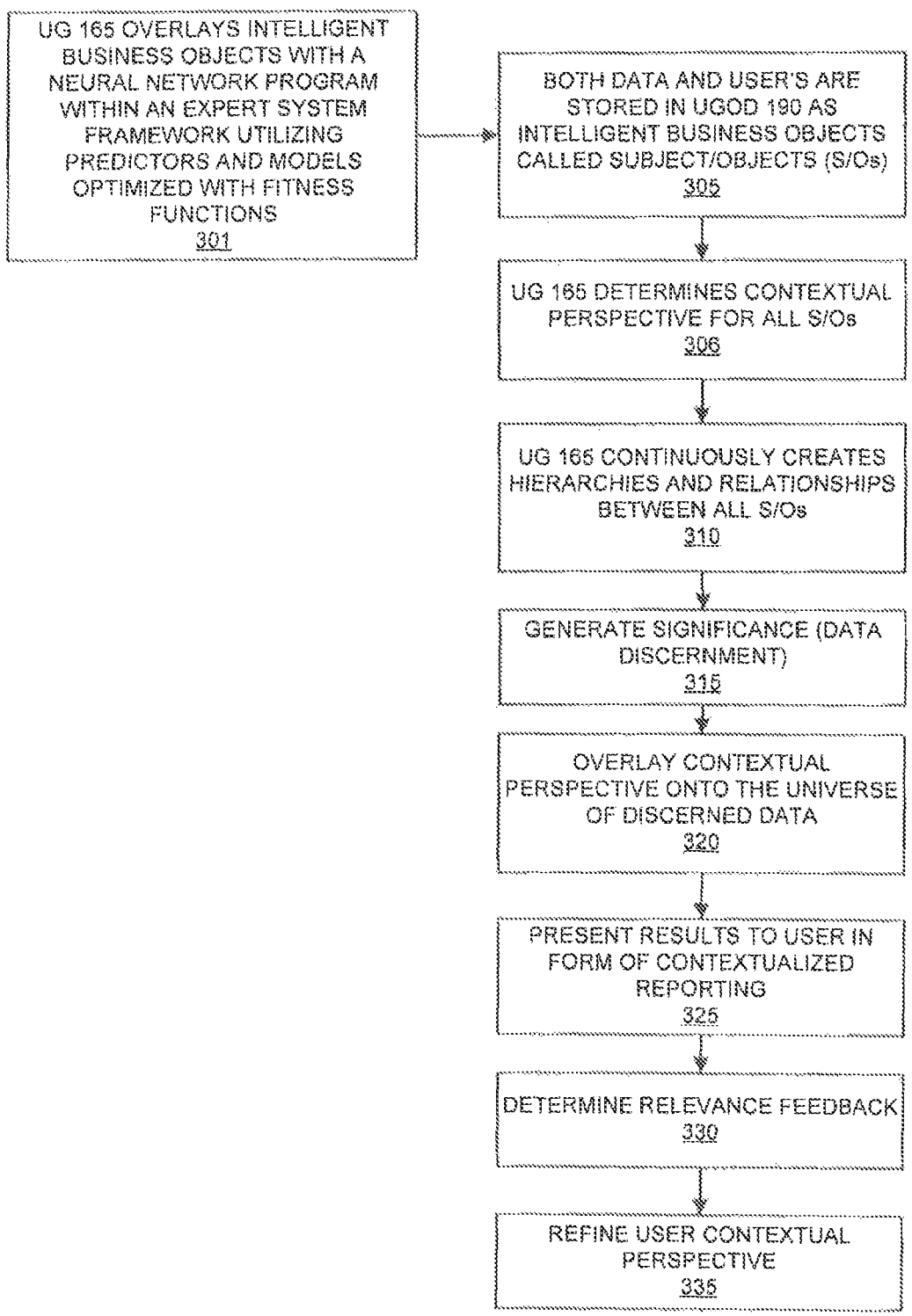
FIG. 3 is a diagram of broad process flow overview, in accordance with one embodiment of the present invention.

As discussed in further detail in the process descriptions of FIGS. 3-5, EACE 115 components (e.g. UIA 147) may interface with the Understanding Generator (UG) 165 and its associated components. In one embodiment, UG 165 is a software application that includes multiple software modules such as, for example: IBO data rationalizer 166, IBO creator 167, context profiler 168, memory creator 169, context overlays generator 170, relationship generator 171, what-if analyzer 172, trend analyzer 173, results formatter 174, corrective action analyzer 175 and context search engine 176.

As practitioners will appreciate, while depicted as a single entity for the purposes of illustration, exemplary databases depicted in FIG. 1 may represent multiple physical and/or hardware, software, database, data structure and networking components. FIG. 1 depicts the types of databases that are included in an exemplary embodiment which include UGOD 190, EDMS 150, user database 140, authorization database 135, and external data source 161. As practitioners will appreciate, the illustrated databases may include a physical coupling of multiple data sources or represent a logical relationship. Therefore, embodiments may include all or none of the components illustrated in FIG. 1, without departing from the scope of the invention. For instance, in one embodiment, raw transactional data that is logically associated with UGOD 170 is stored in a relational database component physically separate from UGOD 170.

User database 140 may store user profile and credential information and authentication server 135 may store security settings and other associated data (e.g. encryption keys).

UG 165 (and its associated software modules) may interface with various data sources including UGOD 190 and enterprise data management system (EDMS) 150. UGOD 190 stores the objects, associations, data and relationships of UG 165 in intelligent business objects (IBOs). IBOs may have core elements such as attributes (ID, Description), dynamic attributes ("object energy"), context, relationships and planes of awareness. Types of IBOs stored in UGOD 190 include, for example, subject/objects (S/Os), Intelligent energy objects (IEOs), Intelligent content objects (ICOs), Intelligent spatial objects (ISOs), and Intelligent Memory Objects (IMOs).

S/Os are the core intelligent business object around which all the other objects are built and associated i.e. they represent an independent entity that owns other object components. S/Os contain base data fields. Each S/O is encapsulated with an intrinsic purpose and understanding. In one embodiment, the base data fields include IDs, descriptions, relationships, attributes and plane of significance (e.g. cost, revenue and outcome).

IEOs are dynamic data fields associated with one or more S/Os where the S/O's dynamic attributes (e.g. price, volume, margin, etc.) are processed based upon constantly changing data.

ICOs are owned by the S/Os and are used to define the applied contextual parameters such as relationships, IEO value parameters, significance, and other aspects of context.

ISOs define timeframes.

An IMO is created as a result of an interaction between an S/O and some other object (S/O, IEO, LEO, etc). During this interaction an IMO is created provided the encounter is considered significant to the subjective nature of the S/O.

EDMS 150 stores and/or provides access to data feeds and other data sources depicted in FIG. 1 such as data source1 151, data souce2 152 and data sourceN 153. As practitioners will appreciate, certain embodiments may access data from any external data source that provides useful and accurate data. For instance the EACE 115, EDMS 150 or any other system 100 component may be interconnected to an external data source 161 via a second network, referred to as the external gateway 163. The external gateway 163 may include any hardware and/or software suitably configured to facilitate communications and/or process transactions between the EACE 115 and the external data source 161. Interconnection gateways are commercially available and known in the art. External gateway 163 may be implemented through commercially available hardware and/or software, through custom hardware and/or software components, or through a combination thereof. External gateway 163 may reside in a variety of configurations and may exist as a standalone system or may be a software component residing either inside system 100, the external data source 161 or any other known configuration. External gateway 163 may be configured to deliver data directly to system 100 components (e.g., UIA 147) and to interact with other systems and components (e.g., EACE 115, EDMS 150) or any other system 100. In one embodiment, the external gateway 163 may comprise web services that are invoked to exchange data between the various disclosed systems. The external gateway 163 represents existing proprietary networks that presently accommodate data exchange for data such as financial transactions, customer demographics, billing transactions and the like. The external gateway 163 may be a closed network that is assumed to be secure from eavesdroppers.

As practitioners will appreciate, embodiments are not limited to the exemplary databases described above, nor do embodiments necessarily utilize each of the disclosed exemplary databases. In addition to the components described above, the system 100, the UGOD 170 and the EACE 115 may further include one or more of the following: a host server or other computing systems including a processor for processing digital data; a memory coupled to the processor for storing digital data; an input digitizer coupled to the processor for inputting digital data an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more system 100 components may be embodied as a customization of an existing system, an add-on product, upgraded software, a stand-alone system (e.g., kiosk), a distributed system, a method, a data processing system, a device for data processing, and/or a computer program product. Accordingly, individual system 100 components may take the form of an entirely software embodiment, an entirely hardware embodiment, or an embodiment combining aspects of both software and hardware. Furthermore, individual system 100 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The systems and methods contemplate uses in association with the healthcare industry, supply management systems, content management systems, materials management systems, accounting systems, artificial intelligence systems, expert systems, accounts receivable systems, operational management systems, cash management tools, logistical planning tools, business intelligence systems, reporting systems, web services, pervasive and individualized solutions, open source, biometrics, mobility and wireless solutions, commodity computing, grid computing and/or mesh computing. For example, in an embodiment, the web client 110 is configured with a biometric security system that may be used for providing biometrics as a secondary form of identification. The biometric security system may include a transaction device and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Web client 110 comprises any hardware and/or software suitably configured to facilitate requesting, retrieving, updating, analyzing, entering or modifying data such as marketing data or any information discussed herein. Web client 110 includes any device (e.g., personal computer), which communicates (in any manner discussed herein) with the EACE 115 via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand-field computers, set-top boxes, workstations, computer servers, mainframe computers, minicomputers, PC servers, pervasive computers, network sets of computers, and/or the like. Practitioners will appreciate that the web client 110 may or may not be in direct contact with the EACE 115. For example, the web client 110 may access the services of the EACE 115 through another server, which may have a direct or indirect connection to Internet server 125.

As those skilled in the art will appreciate, the web client 110 includes an operating system (e.g., Windows NT, 95/98/2000, OS2, UNIX, Linux, Solaris, MacOS, etc.) as well as various conventional support software and drivers typically associated with computers. Web client 110 may include any suitable personal computer, network computer, workstation, mini-computer, mainframe, mobile device or the like. Web client 110 can be in a home or business environment with access to a network. In an embodiment, access is through a network or the Internet through a commercially available web-browser software package.

Web client 110 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Firewall 120, as used herein, may comprise any hardware and/or software suitably configured to protect the EACE 115 components from users of other networks. Firewall 120 may reside in varying configurations including stateful inspection, proxy-based and packet filtering, among others. Firewall 120 may be integrated as software within Internet server 125, any other system components, or may reside within another computing device or may take the form of a standalone hardware component.

Internet server 125 may include any hardware and/or software suitably configured to facilitate communication between the web client 110 and one or more EACE 115 components. Further, Internet server 125 may be configured to transmit data to the web client 110 within markup language documents. As used herein, "data" may include encompassing information such as commands, queries, files, data for storage, and/or the like in digital or any other form. Internet server 125 may operate as a single entity in a single geographic location or as separate computing components located together or in separate geographic locations.

Internet server 125 may provide a suitable web site or other Internet-based graphical user interface, which is accessible by users. An Internet server may provide a suitable web site or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system. In one embodiment, the Apache web server is used in conjunction with a Linux operating system, a MySQL database, and/or the Perl, PHP, and Python programming languages.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages (ASP), Microsoft .NET Framework, common gateway interface scripts (CGI), extensible markup language (XML), dynamic HTML, AJAX (Asynchronous Javascript And XML), cascading style sheets (CSS), helper applications, plug-ins, and/or the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, S/OAF, AJAX, WSDL and UDDI. Web services methods are well known in the art, and are covered in many standard texts. See, e.g., Alex Nghiem, IT Web Services: A Roadmap For The Enterprise (2003) Or Web Services Architecture, W3C Working Group Note 11 Feb. 2004, available at http://www.w3.org/TR/2004/NOTE-ws-arch-20040211, both of which are hereby incorporated by reference.

Application server 145 may include any hardware and/or software suitably configured to serve applications and data to a connected web client 110. Like Internet server 125, the application server 145 may communicate with any number of other servers, databases and/or components through any means known in the art. Further, the application server 145 may serve as a conduit between the web client 110 and the various systems and components of the EACE 115. Internet server 125 may interface with the application server 145 through any means known in the art including a LAN/WAN, for example. Application server 145 may further invoke software modules such as the UIA 147 in response to user 105 requests.

In order to control access to the application server 145 or any other component of the LACE 115. Internet server 125 may invoke an authentication server 130 in response to user 105 submissions of authentication credentials received at Internet server 125. Authentication server 130 may include any hardware and/or software suitably configured to receive authentication credentials, encrypt and decrypt credentials, authenticate credentials, and/or grant access rights according to pre-defined privileges attached to the credentials. Authentication server 130 may grant varying degrees of application and data level access to users based on information stored within the user database 140.

In one embodiment, the system 100 may employ middleware which may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will appreciate that an element or database may be configured to store a specified type or value of data and/or the element or database may actually store such data. Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an IS/O/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using IS/O/IEC 7816-6 data elements; stored as ungrouped data elements encoded using IS/O/IEC Abstract Syntax Notation (ASN.1) as in IS/O/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system includes any of various suitable security features, such as firewalls, access codes, encryption, decryption, compression, decompression, and/or the like.

The system and method may be described herein in terms of functional block components, screen shots, optional selections and various processing steps. It should be appreciated that such functional blocks may be realized by any number of hardware and/or software components configured to perform the specified functions. For example, the system 100 may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

Referring now to the figures, the block system diagrams and process flow diagrams represent mere embodiments of the invention and are not intended to limit the scope of the invention as described herein. For example, the steps recited in FIGS. 2-5 may be executed in any order and are not limited to the order presented. It will be appreciated that the following, description makes appropriate references not only to the steps depicted in FIGS. 2-5, but also to the various system components as described above with reference to FIG. 1.

UG 165 includes software modules that execute logic and processes for importing data from external systems or data feeds, rationalizing the data, parsing the data into IBOs that are stored in object database UGOD 190, enhancing the data objects by discovering and storing significant context using artificial intelligence techniques, storing system users as IBOs in the system and/or forming an understating of the user's context UG 165 treats each IBO the same and gives each IBO the ability to be self-aware and self-learning. This approach allows the UG 165 to generate answers regarding the data and the business implications of the data even before specific questions are asked. UG 165 contextualizes answers via relevant significance to yield useful result sets, which are then prioritized by the user against other result sets obtained across all dimensions and all interested parties. The user and/or the object's imbedded perception drives contextualization.

FIG. 3 is a flowchart illustrating a process overview of one embodiment of the invention. UG 165 overlays intelligent business objects, known as S/Os, with a neural network program within an expert system framework utilizing predictors and models optimized with fitness functions (Step 301), UG 165 creates and processes intelligent business objects (IBOs) that are stored in UGOD 190 as SIGs (step 305). S/Os represent both the data and the users in the system. UG 165 determines the contextual perspective of all S/Os (step 306). In one embodiment, S/Os are both dynamic and intelligent and they constantly look for ways to self-learn and become self-aware. S/Os increase their value by interacting (e.g., continuously interacting) with other S/Os in UG 165.

As the S/Os interact, UG 165 creates (e.g., continuously creates) hierarchies and relationships among the S/Os (step 310). As part of this interaction, UG 165 also generates significance measurements using probabilistic models (step 315). Through this interaction, the S/Os discern significant context and learn from that context. UG 165 overlays the contextual perspective of the user S/Os onto the universe of the discerned data (Step 320). Through this process of continual learning and contextual alignment, the experiences of an organization are captured, yielding probabilistic result sets that are presented to a user in the user's unique context (step 325). The results themselves are in a constant state of refinement based on the user's context and constant new transactions (step 330). Furthermore, the user's context is also refined (step 335).

The UG 165 imparts understanding using dynamic artificial intelligence ("AI"), expert systems techniques, transaction processing, statistical methods (e.g. Bayesian networks), business intelligence techniques and/or database technology. In UG 165, a user does not pose repetitive questions since each object in UGOD 190 understands its own context with relation to all (or a certain subset of) other objects. Hence, the user S/O proxy ("user's S/O") understands the user's requirements that will promote understanding within the limits of the user's context. The more refined the context, the more the result sets delivered are aligned with user understanding. In this way, UG 165 develops an understanding of the distance between where the user is and the desired outcome, i.e. UG 165 anticipates what the user really wants to know.

For instance, in one embodiment, the system 100 is implemented to manage the supply chain and materials management for multiple hospitals. The hospital data and user community is processed by UG 165. The artificial intelligence components of UG 165 cause the S/Os, both user and data, to interact with other SS/Os to create memories. These memories are queried and processed via web services for use by user 105. One set of servers constantly processes transactional data and another set of computing resources run the artificial intelligence functions that discern questions and answers. Answers are staged based on the user's context and relevance feedback is received directly from the user and indirectly by system events (both of which are, for example, encapsulated in ICOs associated with the user's S/O).

IBO creator 167 creates a proxy S/O to represent user 105 ("user's S/O"). The user's S/O is the user's facsimile, i.e., a system interpretation of a user's contextual perspective. Context profiler 168 defines context (what and why something is important together with its relationships) of all IBOs including human users. To enable understanding of itself and of the other S/O's in the system, every S/O is given a context at initialization. Each S/O is a self-aware software entity which has context imparted to it via an ICO, i.e. context is maintained for each S/O within an ICO which holds all (or any portion of relative and relevant context information, ICOs are owned by the S/Os and define the applied contextual parameters such as relationships, object energy values, probabilities, planes of significance (cost, revenue, patient outcome) probabilities and/or other aspects of context.

Context for the user's S/O comes from external inputs such as the user's 105 organization and job function, Myers-Briggs personality profiles, user 105 search history and user 105 feedback. Data S/Os (which can be thought of as the non-human "users" of UG 165) are imparted context through cost, revenue and outcome data. Artificial intelligence techniques assist an ICO to discern more knowledge through data rationalization, whereby the ICO interacts with other S/Os and ICOs. By monitoring user interaction, the UG 165 updates the user S/Os context and the associated perception. The change in context is communicated (e.g., immediately communicated) to all other S/Os, which in turn, create new memories.

Capturing industry experience and deriving practical user targeted understanding, starts with identifying useful inputs. In one embodiment, the UG 165 is implemented in the healthcare industry and its inputs include the health level seven (HL7) schemas, health care data transactions, and/or user input interfaces to seek/obtain results and set contexts. UG 165 analyzes these concepts of use to build its concept space. HL7 is an American National Standards Institute (ANSI) accredited standards developing organization (see, www.hl7.org). In one embodiment, IBOs are defined from the HL7 schema, which is mapped to UG 165 functionality.

In UG 165, raw data is translated into IBOs and transactional data is fed to DD 167 from purchase order data, invoices, payor contract records, billing records, and other industry related data stored in EDMS 150. DD 167 rationalizes data entry into the system and is fundamental in the creation of IBOs. Transactions are imported and substantiated, self-evolved and related to their associated S/Os. As a data feed is processed, the IBO creator 167 checks to see if an S/O already exists for the item being processed. If it does not, then IBO Creator 167 creates a new S/O. In one embodiment, the data feed schema is viewed in a data rationalizer user interface that assists a user in translating the data feed schema by, for example, identifying the specific entities within the data feed schema. Essentially, this data rationalizer assists in defining S/O attributes and associated IBOs.

In one embodiment, transactional data items related to an S/O representing an item of inventory in a hospital's material management system (e.g. a syringe or an artificial hip) are processed by DD 167. For example, an artificial hip (i.e. the S/O being processed) is related to data items such as the cost of the item, the quantity associated with the transaction and unit of measure and these related data values are stored in an IEO. Furthermore, in this example, the associated hospital data item is also created as an S/O in UG 165 and an IRO is created between the artificial hip and the new hospital S/O.

S/Os in UG 165 are intrinsically programmed to evolve and accomplish two primary directives, "Who am I" and "How can I serve?" The evolution of an S/O is driven by the artificial intelligence aspects of the UG 165 based upon fundamental concepts. For instance, an SO comes into being with its core physical characteristics which exist no matter how it is perceived by other objects in UG 165 or external systems. Thus, an object may initially only be associated with a single name or item number. However, over time the object is used for many purposes and associated with different costs and risks. Hence, the object may be referred to differently depending upon the perspective of the user or the purpose for which the object is being used. UG 165 builds objects from their physical being outward where the contextual weighted associations are created with underlying belief systems driven by cost, revenue and outcome.

One example that illustrates these functions and features is a bandage and its use in a healthcare facility. The bandage is initially defined by its physical characteristics size, shape, color, composition etc. The bandage is related to other items or objects in the healthcare facility and the bandage may be referred to differently depending on the function it is serving or the perspective of the user. Hence, an S/O that represents the bandage develops a sense of "Who am I" by developing connections to objects, procedures, costs and by developing aliases (e.g. synonyms) representing "who it is" based on varying contexts. Similarly, as the many uses of the bandage are recorded by UG 165 and other S/Os interact with it, the S/O representing the bandage in UG 165 gets a sense of "How do I Serve." Each of these elements concerning "Who am I" and "How do I Serve" has context based on who uses it, when it is used, how it is used, what is used with it, where it is used and their level of interest in the primary business driver's of cost, revenue and outcome. Thus, based on AI analysis on all planes for all dimensions from the subject's perspective a bandage develops its definitions of "Who am I" and "How do I Serve." UG 165 uses the intelligence captured in these intelligent objects to provide contextually significant information to users. UG 165 users receive contextual information with a Probability of Fitness answering "Who the Bandage is" and "How it serves." Results are generated depending on the contextual overlay of the user (e.g. whether the user is a nurse, a floor manager, an accountant or the hospital's chief operating officer) and users are presented information (e.g. name, uses, cost, outcome) in appropriate context and ordered based on an underlying belief system's expression of an interest in cost, revenue and outcome.

In one embodiment, to accomplish this evolution, input data stored in EDMS 150 is processed by DD 167 using a combination of probabilistic calculation and S/O relationships to discern who and what the S/O object is. As S/Os enter into UG 165 all links are established based on the S/Os internal belief system. In one embodiment in the healthcare industry, factors such as cost, revenue and patient outcome may be used to measure the significance of the data. These core elements are used throughout UG 165 and many are evolved using AI techniques. In one embodiment, the Ontology-Based Health Care Data Integration and Normalization Tools Protëgë-Owl™ is used to enable the evolution of the IBOs using AI. In one embodiment, custom AI techniques and software modules are used to interpret schemas and align data items based on transactional use gathered from hundreds of hospitals, business catalogs, business transactions and business reports that reveal their own context and use.

Data Awareness takes data from its raw form (or almost raw) and evolves it into contextualized memory. An evolving S/O can be thought of as a subject where every other S/O is an object. By being a subject (i.e. an observer), an S/O may compute its relationships relative to the other objects (i.e. all other S/O's in the system), clean up its description and attributes, accrue spatial values, associate to the planes of awareness and understand its basic function and how it is contextually significant. FIG. 6 presents an awareness ladder illustrating how data awareness is applied in one embodiment. As the data becomes more intelligent and memories are created with the context controlling the result sets, the impact is like that of having a consultant "fitted" to the user's awareness level. For example, at Level 1 users need consultants to make decisions. Similarly, users that know how to make decisions typically need help in validating the decisions, and so on, up the chain until it reaches a level of complete understanding whereby the user utilizes little or no external support because the data and corresponding action steps are self-evident.

New S/Os trigger DDs 167 bilateral data discernment process in response to each new S/O entering UG 165 creating a ripple effect with all existing S/O. The subject object bi-directional relationship yields perspective. The subject object relationship is applied to all S/Os and each object "looks back" based on its significance to the defined S/O subject. The subject overlays its context on its related (subjective) objects and the object shows the subject what the subject expects to see relative to the context used in the "looking" process. All S/Os relevance is based on the perspective of the subject and the alignment of the objects' context therein. Significance is arbitrary and changes depending on who/what is the subject. For instance, a person's top 10 music songs might not be the same as another person's, even though they may want to align with the "peer group". This is a departure from existing system architecture which seeks to impose a fixed perspective in the form of relationships and categories.

Discernment is based on a probabilistic assessment of the contextual significance of the data. DD 167 uses probabilities and normal distribution curves to identify those values that have the most probability of contextual significance which is known as probability of fitness or "POF," POF is determined by the contextual perspective of the user. In UG 165, significance revolves around cost, revenue and outcome (CRO). The more in tune UG 165 is with each user's CRO and each object's CRO the better the ability to report and project results, especially when the Belief System reflects the contextual significance of CRO at the field level.

A POF has two primary purposes. In particular, a POF is used to define what has taken place and to define the threshold of "relative significance" for some S/O event. Positive discernment occurs when the POF of the object is greater than the POF requirement defined by the interrogating subject. In one embodiment, when positive discernment occurs, the associated property values of the object are merged with those of the subject. In one embodiment, the POF value is system determined based on statistical analysis and/or artificial intelligence, and in the absence of sufficient data to support machine learning, the POF is established by a domain expert.

In UG 165, an S/O's BS helps the S/O define "Who it is" in relation to the other S/Os in the system. While traditional systems typically define data based upon a schema, UG 165 instantiates an S/O within a belief system that gives the S/O some definition, while also allowing the S/O to self-define based upon interaction with other S/Os. During this process of self-defining, the S/O traverses the different operating levels of its belief system as defined by the table below. In one embodiment, seven operating levels exist within a class or species Belief System (BS):

| Level | Type | Characteristic |
|---|---|---|
| 1 | Quarantine | No History. Subject creates its own map within the universe of data. The map is dynamic. |
| 2 | General Population | S/Os ordered by their own inherent context based upon BS. |
| 3 | Differentiation of description required to validate primary properties | Typically description. Introduce user context and evaluate based upon POF. |
| 4 | Significance of one of the dynamic values | Cost, revenue, outcome. |
| 5 | Significance of two of the dynamic values | |
| 6 | Significance of all three of the dynamic values | |
| 7 | Autonomous self aware agent | Not limited by individual BS. Inherited context comprised of multiple schema properties. |

The BS is designed to progress a S/O to a level for serving the needs of another S/O, including user S/Os. The more complex the S/O, (typically associated with multiple dynamic values), the higher the awareness level of the S/O BS, and the more complex is its associated schema and relationships.

In one embodiment, Level-1 of the BS operates according to the following process:
All S/Os are instantiated into Level-1 (quarantine) having a minimum of an identifier ("ID") and at least one other property.
items are instantiated with full properties as directed by the level-1 BS.
Properties pertaining to an S/O contained in quarantine can be used to validate other S/O properties, but cannot be inherited until the quarantined S/O is released from quarantine.
S/Os in quarantine participate in the originating source processing and output results.
A source other than the originating source for any given ID in quarantine does not have access to a quarantined ID.
All IDs require 3 independent sources to validate their authenticity before being released from Level-1 quarantine.

The following example illustrates the above rules: A data source from one hospital, "Hospital A," provides purchase order data to UG 165. An ID for an x-ray machine is imported as part of the data feed and an S/O is created and assigned to Level-1 of the BS. The S/O for they-ray machine can be part of the analysis and results for Hospital A, but not for other hospitals. Furthermore, other S/Os from the same data feed as the x-ray machine's S/O are available for interaction (e.g. building relationships and/or inheriting properties), but S/O's originating from other data feeds are not available for interaction.

In one embodiment, Level-1 of the BS operates according to the process illustrated in FIG. 4. All S/Os are instantiated into Level-1 (quarantine) having a minimum of an identifier ("ID") and at least one other property (step 405). Items are instantiated with full properties as directed by the Level-1 BS (step 410). Properties pertaining to an S/O contained in quarantine can be used to validate other S/O properties, but in one embodiment, cannot be inherited until the quarantined S/O is released from quarantine (step 415). S/Os in quarantine participate in the originating source processing and output results, but a source other than the originating source for any given ID in quarantine does not have access to a quarantined ID (step 420). In one embodiment, all IDs include 3 independent sources to validate their authenticity before being released from Level-1 quarantine (step 425).

The following example illustrates the above rules: A data source from one hospital, "Hospital A," provides purchase order data to UG 165. An ID for an x-ray machine is imported as part of the data feed and an S/O is created and assigned to Level-1 of the BS. The S/O for the x-ray machine can be part of the analysis and results for Hospital A, but not for other hospitals. Furthermore, other S/Os from the same data feed as the x-ray machine's SO are available for interaction (e.g. building relationship's and/or inheriting properties), but S/Os originating from other data feeds may not be available for interaction.

Following the Level-1 instantiation process, all S/Os can inherit properties from other S/Os. FIG. 5 illustrates S/O interaction within UG 165. One S/O includes linkage with another S/O (step 505). All S/O "objects" can only become "subjects" in order to satisfy their primal directives of determining "Who am I" and "How can I serve." Therefore, an S/O object converts to a subject by another S/O and its property values are insufficient to satisfy: its own BS or another S/O request, including a request front the user's proxy S/O. One S/O interrogates another S/O (step 510) and inherits desired properties (step 515). The interrogated S/O becomes the "subject" (step 520) and it progresses through the species (class) BS hierarchy based on interactions from other S/Os and the need to satisfy property values requests (step 525). Items progress within the belief system to the level sufficient to acquire the information for responding to the questioner (representing the process of dynamic linkage of S/Os).

The subject inherits properties of the interrogating object and gains partial visibility and understanding (step 530). UG 165 determines if there is a source conflict (ix, properties that should be equal are not equal). If there is a source conflict, UG 165 validates properties from the parent (step 536), identifies the change value (step 537), creates an alias for the legacy value (step 538) and creates an association between the legacy value and the new value (i.e. the conflicting value) (step 539). If there is no source conflict, then UG 165 determines if there is positive discernment (step 540). If there is positive discernment, the property values of the subject and the object are merged (step 560), if there is no positive discernment, then UB 165 checks the BS operating level (step 550). If the BS operating level is 6 or greater, the subject S/O is re-instantiated as an autonomous agent (e.g. moves to BS level-7) (step 555) and UG 165 determines if there is positive discernment (step 540), if the BS operating level is less than 6, then the subject S/O moves to the next higher BS operating level (step 525) and the process repeats. This process represents a modification of the original item schema to a new hybrid schema in which the S/O subject has gained partial visibility and understanding of the interrogating S/O object, as directed by the operating belief system.

An example of this process is a surgical procedure S/O that has a particular item ID for a scalpel contained in one of its attributes. In this case, the procedure S/t) BS requires a linkage with the scalpel, i.e. the S/O associated with the Item ID. This precedence merger of BSs causes property inheritance. The procedure S/O interrogates the Item S/O and inherits the desired Item properties. This action also causes the Item to activate as a subject and move to BS Level-4. At this level, the Item S/O inherits additional properties normally associated with a procedure ID. However, the Item's view of the procedure is limited by the operating constraints of the Level-4 BS. This process continues until the scalpel S/O has reached level 7 at which point the scalpel S/O is re-instantiated as an independent autonomous agent with a dynamic BS based on external contextual overlays. The interrogating S/O is always the driver and has its needs answered first.

Essential essence is defined as the minimum number of properties for universal identification of itself. In other words, essential essence is the moment in time definition of an S/O's "Who am I" as it represents the minimum critical attributes that defines a thing, whether that thing is an item, procedure, doctor, etc. It is the accumulation of these critical/essential attributes that defines when something is "universally understood," For example, item number "DRG209" is universally known as a hip replacement procedure; however, item number 172937-2 can be represented by multiple manufacturers. Differentiation in the later example includes additional properties to ensure correct identification (e.g. description and/or manufacturer ID).

The energy fields are assessed with the subjects' dimensional significance to see if a probability significance threshold has been reached. The energy band is codified and a perspective window of significance is discerned. Hence, if the Chief Financial Officer had an interest in items whose cost increased by more than 20%, it would be deemed significant and processed accordingly. The context can look for each or any combination of significance dimensions and the probability of significance selects and aligns the results. Context drives the selection process which can be carried out on demand or cyclically. The process of the subject and the object looking back allows the data itself to resolve value, relationship and schema inconsistencies by applying neural network and forecasting techniques to allow the data to define itself (through experience and evolution) and recast itself according to the probabilistic significance of multiple and/or dynamic contexts. AI tools employed by UG 165 include Bayesian Reasoning, Bayesian Prediction, Classifier, Back Propagation, Decision Trees, K-Means, Nearest Neighbor and other classic algorithms. For more information on AI techniques see "Artificial Intelligence a Modern Approach" by Stuart Russel and Peter Norvig; "Machine Learning" by Tom Mitchell; and "Pattern Classification and Scene Analysis" by Richard Duda and Peter Hart, each of which are hereby incorporated by reference.

Within the UG 165, each S/O (e.g. purchase order line item) has as the same or similar significance as any other S/O. For example, in an embodiment, a titanium hip has as much potential capability within the UG as a plastic screw. Each has its own S/O that has the power to discern all of its potential relationships. For example, an SO that represents a disease related grouping (DRG) (which is an inpatient procedure code) would have the ability to discover and develop its relationship with DRG's in other hospitals and/or with outpatient procedure codes (e.g. procedure codes represented in current procedure terminology (CPT)). As each S/O and group of S/Os has a CRO significance value, the presentation of S/Os is prioritized based on significance that has been defined in the user's proxy context. In one embodiment, for a user 105 that is a materials manager for a hospital, a syringe by itself has only a minimal cost CRO significance. However, all of the costs of all of the items for the manufacturer of the syringe will have a far more significant CRC value and would be likely of interest, so the S/O representing the materials manager would have a context associated with it that reflects that the CRC value is significant. However, the same CRC value would not be significant to a user 105 who is, for example, a chief financial officer.

UG 165 encapsulates "snap-shots" of data, relationships and context as memories. Memories are created by memory creator 169 when contextually appropriate. In one embodiment of UG 165, context is unique for every S/O. The combination of an S/O's energy value (stored in an IEO), context (stored in an ICO) and time, produce "thoughts" (i.e. significant events) which are captured as potential memories by memory creator 169. Memory creator 169 measures the significance of the potential memory and those that reach a threshold of significance are stored as IMOs together with their spatial sequence in time.

For example, when an S/O interacts with another object, this subjective "experience" is determined relevant based on the operating belief system of the viewing S/O in determination of the S/O's primary directives (i.e. "who am I" and "how do I serve"). The SO context drives the creation of memories which are in effect a picture matching the desired probability of contextually significant values, relationships, CRO and time frames. If the encounter is considered significant to the viewing S/O then the inherent values derived from the objective S/O, IEC and IBO are stored as an IMO. IMOs retain all (or a portion of) associated values, attributes, temporal, contextual and special. Each memory has a spatial time dimension attached to it known as an Intelligent Spatial Object (ISO). Thus, memories contain the energy values, but also the context information including relationships and planes of significance that were involved in creating the memory. These memories are captured and immediately available for contextual overlays. In one embodiment, the memory creation process is driven by artificial intelligence techniques and is modeled after the process human beings use to memorize significant thoughts. Appropriately aligned "thoughts" are stored as contextual memories.

The memory creator 169 is triggered by user 105 input to create memories. Once a user signs on, if this is the first time, an S/O is created as a facsimile of the user 105 in the UG 165. The user 105's S/O is assigned an initial operating belief system. User's 105 S/O interacts with the existing S/O network to create a "memory pool" that is unique to user 105.

Relationships are established in UG 165 by relationship generator 171. In UG 165, entities actualize their impact based on the probability of impacting everything else through their relationships. Relationships are both defined by DD 167 via user input by associating input data schema fields to related S/Os, as well as derived via source, genealogy, precedent and other information via relationship generator 171, or example, in one embodiment, a PO Line Item is associated to a vendor, and a hospital. If the associated SOs do not exist, the AI Relationship Generator creates the SOs and subsequently associates the source S/O to the, now new, target S/Os.

Relationship generator 171 creates three types of relationships: 1) Independent—Explicit relationship related independently to itself; 2) Dependent—Implicit relationship, e.g. parent (item's relationship its manufacturer) or sibling (other items made by the same manufacturer); 3) Interdependent— Inter-related objects, e.g. competitive manufacturer's item. Relationship Generator 171 creates these different types of relationships and keeps track of changes in relationships. Relationships are used extensively within UG 165 to drive context and memories.

UG 165 determines the answers to questions before they are asked. Various components of UG 165 process raw data, develop relationships among the data, evolve the data based upon its significance and create contextualized memories of data conditions that maximize POF functions. In addition to determining potential result sets based upon actual events or data values, what-if analyzer 172 forecasts alternative outcomes together with the outcome's respective potentiality. What-if analyzer 172 creates (e.g., constantly creates) memories by asking pertinent questions on each plane of awareness (cost, revenue, patient outcome) and at each "node" of business content. Only significant results from the what-if analyzer are stored as memories (e.g. by creating an IMO). Hence, UG 165 is more like a significant contextualized memory search engine, than a conventional system. That is, for the most significant S/Os, what-if analyzer 172 duplicates the "what-if" thought process that would typically surround the most significant S/Os, i.e. How does an organization improve performance to maximize or mitigate the CRO results set? What-if analyzer 172 uses advanced probabilistic reasoning to create comparative understanding of the data in the context of the business.

What-if analyzer 172 first creates a bell curve of e-fields and truncates the two tails of the bell curve based upon significance plus a variance. What-if analyzer 172 then re-assembles them by re-running the what-if scenario in the context of that curve to form a normal distribution looking at the centers representing a maximum productivity of effort. Memory creator 169 creates understanding surrounding empirical information by staging active memories based on contextual significance and creating understanding surrounding these memories. UG 165 identifies the most significant S/Os (based on the existing user context as defined in the belief system) and what-if analyzer 172 creates outputs that provide additional understanding surrounding the most significant S/Os that are being presented.

In one embodiment, the corrective action analyzer 175 calculates corrective action steps to substantially meet original target performance objectives. In one embodiment, corrective action analyzer 175 projects probability thresholds of predictive outcomes based on alternative scenarios. The result sets may also be enhanced by trend analyzer 173 which predicts change in potential outcomes based on dynamic status of user versus selected peer group.

Context search engine 176 provides contextual search capabilities that can be integrated into predictive models and used to help define identification and function. The context search engine 176 can also serve as an external data gathering/integration tool by retrieving data from an external search engine for incorporation into UG 165. For example, context search engine 176 may be used to locate and integrate patient outcome data. Throughout the search and results examination process, the active input by user 105 has the potential to change and reorder the user's 105 contextual significance CRO result set and corresponding S/Os. UG 165 uses the results formatter 174 as a report generator that presents information in formats that promote easy user understanding, e.g. summary or chart. The results are prioritized both explicitly and by use analysis. In one embodiment, UG 165 provides a contextual path trace function that allows user 105 to view the analysis performed to develop the significance of the data being presented. In one embodiment, results are presented in a graphic user interface dashboard format that provides user screens for soliciting user context data, performing user driven what-if analysis, viewing results, and configuring custom reports.

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way. Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean one and only one unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the invention has been described as a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A computer-based method comprising:
   analyzing, by a data discernment computer, first input data;
   identifying, by the computer and based upon the analyzing, first item information associated with a first item;
   analyzing, by the computer, a master database to identify a first relationship between the first item and a first existing item, wherein the first existing item is one of a plurality of existing items; and
   creating, by the computer, a first intelligent business object (IBO) to store at least one of: at least a portion of the first item information and the first relationship.

2. The computer-based method of claim 1, further comprising determining, by the computer, a first context of the first item.

3. The computer-based method of claim 2, wherein the first context is based upon at least one of: the first input data, a second input data, the first item information, the first relationship, a first data source, a supplier of the first item, a cost structure of the first item, a function of the first item, a manufacturer of the item, a complimentary item that is complimentary to the first item, a substitute item that is a substitute to the first time, and a user of the item.

4. The computer-based method of claim 2, further comprising creating, by the computer, a first intelligent context object (ICO) to store the first context.

5. The computer-based method of claim 1, further comprising creating, by the computer, a first intelligent relationship object (IRO) to store a relationship between the first IBO and a second IBO.

6. The computer-based method of claim 5, wherein the creating the first IRO is in response to at least one of: an external event, a user input, a data input, a change in value of the first IBO, or a change in value of the second IBO.

7. The computer-based method of claim 5, wherein the first IRO comprises at least one of: an independent relationship, a dependent relationship, or an interdependent relationship.

8. The computer-based method of claim 1, further comprising creating, by the computer, a first intelligence memory object (IMO).

9. The computer-based method of claim 8, wherein the IMO includes data for an energy value data, a context, and a time.

10. The computer-based method of claim 9, wherein the creating the first IMO is in response to a significance level for the IMO data exceeding a threshold level.

11. The computer-based method of claim 8, further comprising creating, by the computer, a first Intelligent Spatial Object (ISO) for the time data of the IMO.

12. The computer-based method of claim 1, further comprising calculating, by the computer, a probability of fitness (POF) for the first IBO.

13. The computer-based method of claim 12, further comprising determining, by the computer and based upon the POF, whether to make the first IBO available to a consumer.

14. The computer-based method of claim 1, further comprising using, by the computer, a belief system to control evolution of the first IBO.

15. The computer-based method of claim 14, wherein the belief system comprises a plurality of operating levels.

16. The computer-based method of claim 15, further comprising using, by the computer, the belief system to determine that the first IBO inherits data from a second IBO.

17. A computer-based method comprising:
analyzing, by the computer, a profile of a user;
creating, by the computer and based upon the analyzing, a user context; and
storing, by the computer, the user context in an intelligent context object (ICO).

18. The computer-based method of claim 17, wherein the user profile comprises at least one of: a job function, a personality profile, a user preference, a user history, or a user action.

19. The computer-based method of claim 17, farther comprising:
using, by the computer, the user context to identify one or more intelligent business objects (IBOs) of interest to the user; and
creating, by the computer, a result set of the identified one or more IBOs.

20. The computer-based method of claim 19, further comprising tailoring, by the computer, the result set of IBOs based on the user context.

* * * * *